United States Patent
Campbell

[11] Patent Number: 6,161,702
[45] Date of Patent: Dec. 19, 2000

[54] LIFTING SYSTEM FOR BICYCLE STORAGE AND METHODS USING THE SAME

[76] Inventor: Dale R. Campbell, 616 N. Sheridan, Loveland, Colo. 80537

[21] Appl. No.: 09/249,455

[22] Filed: Feb. 12, 1999

[51] Int. Cl.[7] .................................................... A47F 7/00
[52] U.S. Cl. .......................... 211/17; 211/1.57; 211/117; 248/329
[58] Field of Search ................... 211/1.51, 1.57, 211/17–20, 113, 117; 248/327–329; 206/806; 242/388, 388.1–388.5; 254/264, 389, 385

[56] References Cited

U.S. PATENT DOCUMENTS

| | | | |
|---|---|---|---|
| 28,961 | 7/1860 | Boynton | 211/117 |
| 108,818 | 11/1870 | O'Dell | 211/117 |
| 402,130 | 4/1889 | Bedford | 248/328 |
| 526,825 | 10/1894 | Weston | 211/117 |
| 557,567 | 4/1896 | Eddy | 211/17 |
| 561,185 | 6/1896 | Weston | 211/117 |
| 581,803 | 5/1897 | Armstrong | 211/117 |
| 596,176 | 12/1897 | Naylor | 211/117 |
| 621,819 | 3/1899 | Ivatt | 211/17 |
| 624,231 | 5/1899 | Martin | 211/17 |
| 633,806 | 9/1899 | Cifka | 211/19 |
| 990,346 | 4/1911 | Dreyer | 248/328 |
| 997,518 | 7/1911 | Taylor | 211/117 |
| 1,230,414 | 6/1917 | Knapp | 211/117 |
| 1,232,501 | 7/1917 | Colen | 211/19 |
| 1,272,273 | 7/1918 | Kell | 248/328 |
| 1,633,344 | 6/1927 | Moran | 248/328 |
| 2,435,755 | 2/1948 | Schimpff | 211/117 |
| 2,934,302 | 4/1960 | Langert | 248/328 |
| 3,770,133 | 11/1973 | Kolker | 211/19 |
| 3,782,559 | 1/1974 | Wright | 211/17 |
| 3,872,972 | 3/1975 | Cummins et al. | 211/17 |
| 3,883,002 | 5/1975 | Moore | 211/18 |
| 3,907,113 | 9/1975 | Kropelnitski | 211/19 |
| 3,924,751 | 12/1975 | Ballenger | 211/17 |
| 4,167,833 | 9/1979 | Farina et al. | 49/199 |
| 4,343,404 | 8/1982 | Folsom | 211/17 |
| 4,749,089 | 6/1988 | Steward, III | 211/18 |
| 5,067,621 | 11/1991 | Alexander | 248/328 |
| 5,092,504 | 3/1992 | Hannes et al. | 211/17 |
| 5,183,162 | 2/1993 | Ritzenthaler | 211/1.57 |
| 5,199,843 | 4/1993 | Sferra | 414/592 |
| 5,263,687 | 11/1993 | Garbiso | 248/327 |
| 5,354,035 | 10/1994 | Helgren | 254/399 |
| 5,474,189 | 12/1995 | Peterson | 211/18 |
| 5,794,793 | 8/1998 | Frederick | 211/20 |
| 5,820,455 | 10/1998 | Breedlove | 248/327 X |
| 5,845,788 | 12/1998 | Robolin | 211/17 |
| 5,897,104 | 4/1999 | Garbiso | 248/327 |

OTHER PUBLICATIONS

New Product, Luna Technologies Inc., Plymouth, MN 55442, company catalog, on the Internet.

K&M Konig & Meyer, Platzsparend: Hängen Sie Ihr Faharrad einfach an die Decke!

*Primary Examiner*—Daniel P. Stodola
*Assistant Examiner*—Jennifer E. Novosad
*Attorney, Agent, or Firm*—Santangelo Law Offices, P.C.

[57] ABSTRACT

A bicycle-lifting system and method for storing a bicycle above the ground in an enclosure such as a storage house, or a garage comprises a reel and a pair of straps mechanically attached to the reel. A bicycle may be lifted and stored above the floor in the enclosure when the pair of straps are wound around the reel. The system may be operated either mechanically with a crank or electrically with a motor.

75 Claims, 5 Drawing Sheets

LIFTING SYSTEM FOR BICYCLE STORAGE AND METHODS USING THE SAME

I. BACKGROUND OF THE INVENTION

1. Field of the Invention

Generally, this invention relates to a bicycle storage system. Specifically, this invention relates to a bicycle storage device for use in an enclosure such as a storage house or a garage or the like to store a bicycle. This invention also relates to a method for storing a bicycle in a garage setting to clear the floor for its intended usage. The designs, requiring little garage area, are particularly suited for storing a bicycle in a tight garage.

2. Background of the Invention

With increasing number of bicycles in a family, storage of bicycles has become a problem. It is desirable to relieve the garage space or storage space in an enclosed garage house for the normal utility to which such structures are intended. It would be further desirable to provide storage means for one or more bicycle within a garage, but without, at the same time, utilizing floor space otherwise needed for the storage of automobiles.

A wide variety of bicycle storage devices have been designed and bicycle storage systems, or a bicycle lifting systems, are common in a market. Among them some are for a single storage of a bicycle while others are for the storage of plurality of bicycles. All the designs have a single purpose: i.e., to store a bicycle or bicycles in a free place above ground within an enclosure, such as a garage or a storage house or the like, so that a usable area in the enclosure can be cleared for automobiles and free access to and from the automobiles and/or for other storage purposes.

As far as the designs themselves, the available bicycle storage devices each have their individual advantages as disclosed in the prior art. A hoistable storage rack for bicycles as described in U.S. Pat. No. 3,924,751, utilizes a support bar having horizontally spaced bicycle hooks mounted to hold a bicycle or a pair of bicycles. The facilitating elements are pulley means. Another example of the previous type of invention is the ceiling cycle rack as described in U.S. Pat. No. 3,782,559. This rack includes a plate removably extended from the ceiling by a plurality of hooks and a pair of J-shaped hangers attached to the plate and laterally adjustable thereon to engage a bicycle frame. In other examples, the bicycle storage system in U.S. Pat. No. 3,872,972 uses a counterweight device and a cable system to lift a bicycle in a garage, while the multiple bicycle support system disclosed in a U.S. Pat. No. 3,907,113 employs a bicycle support mechanism, a couple of pulleys and a cable to complete the bicycle-lifting job in a garage. In general, these systems are operated mechanically and employ a number of pulley means and ago cables, and/or in combination of a support bar or a plate.

A new type of a bicycle storage system was described in U.S. Pat. No. 3,770,133 that was designed on the principle of a garage door opener. However, this is still a mechanical system. According to this invention, the bicycle rack is moved along a track by a cable trained from a winch thus lifting the bicycle and suspending the bicycle at the ceiling area.

Although the previous inventions discussed above have advantages, there also exist some disadvantages. Uses of a pure pulley system and the support bar or the plate may not be convenient for teenagers or elderly people when they try to lift and store the bicycles. The nature of using a pulley design and a cable requires constantly pulling the cable with both hands and thus may cause inconvenience if the users are the teenagers or the elderly. Sometimes accidents may occur if the cable is slipped away from their hands. The design for using a counterweight device is very nice but the system itself requires more materials than necessary and is very complicated for installation. Therefore, it may not be ideal for purposes of simplicity, convenience and inexpensiveness. The design on the principle of a garage door opener to operate a bicycle rack is a comparatively complicated system and may require extensive energy and labor to install.

Therefore, there is a long felt, but unsatisfied need for the invention while the needed implementing arts and elements had long been available. When a device such as a bicycle storage system is designed for use, it needs to satisfy the common requirements for, first of all, simplicity; second, convenience; third, safety; and fourth, easy installation. The problems existing in the field are the mechanical operability, complexity and unavailability of an appropriate electrically operable device. Substantial attempts by those skilled in the art to fill the need of mechanically operated system that is simple and easy and power operated system that is simple to use and easy to install have not been successful, possibly because of failure to understand the nature of problems.

The present invention has some advantages over the prior art. The electrical operation in one of the preferred embodiments greatly advanced the bicycle storage system. It is simple to use, and suitable for any persons, especially those teenagers and elderly. Use of a reel or reels in the present invention is more mechanically advantageous than other means such as a pulley or pulleys exclusively. The lifting components such as the straps do not merely pass through the reel or reels but wind around the reel or reels for easy storage and operation. Thus, it requires less operating space than what the prior art requires and is simple to install. Application of a crank in another preferred embodiment of this invention has added a safety feature to the system and makes it easier to operate. Until the present invention, the bicycle storage systems in the art have not employed such a reel or reels. Such an electrical operating unit has not yet appeared in the art and thus has greatly improved the efficiency and advanced designs of the traditional bicycle storage system. The design of a reel in combination with a spring successfully balanced the bicycle weight and thus the system only employs an inexpensive motor with minimum power supply to fulfill the function. In addition, this system can be inexpensively manufactured and easily installed.

II. SUMMARY OF THE INVENTION

Accordingly, one object of the present invention is to provide a novel, easily operable bicycle storage system using a reel combined with a supporting pivoting element and a cable. Use of such a reel is novel and simple for any bicycle storage system as aforementioned. The present designs are for arranging a bicycle with a view toward utmost simplicity in construction and efficiency in operation and for storing the bicycles off the floor so as to require a minimum amount of floor space in the garage setting.

Another object of this invention is to provide a novel electrical operation for this bicycle storage system. A motor is required to operate the system electrically. The motor may be connected to the reel directly or indirectly and a control unit is also included for simplified operation. Use of a motor in combination with a reel greatly improved the bicycle storage system.

Still another object of this invention is to provide a safely operable mechanical bicycle system that is convenient for any people of different ages. The crank feature for manual operation and the on-off switch function for electrical operation fulfill some aspects of the safety design. The system may be also operated by a remote control unit. In this case, a sensor may be incorporated to the motor to sense a remote signal and thus to control the motor.

Naturally, further objects and advantages of the invention will be readily disclosed throughout other areas of the specification, the drawings and claims.

IV. DETAILED DESCRIPTION OF THE PREFERRED EMBODIMENT

The basic concepts of the present invention may be embodied in many different ways. The minimum requirement of one embodiment of the bicycle storage system is a reel, a supporting pivoting element, both pivotingly fixed somewhere on the ceiling of an enclosure such as a storage house or a garage or the like by any means of commonly available pivoting elements such as screws or axels, and two straps mechanically connected to the reel.

As can be seen from the drawings and in combination with the specification, the basic concepts of the present invention are illustrated hereby in detail to show some of the preferred embodiments of the present invention. It should be understood that, by providing the drawings, the inventor by no means wants to limit the scope of his invention in any manner.

Figure 1:
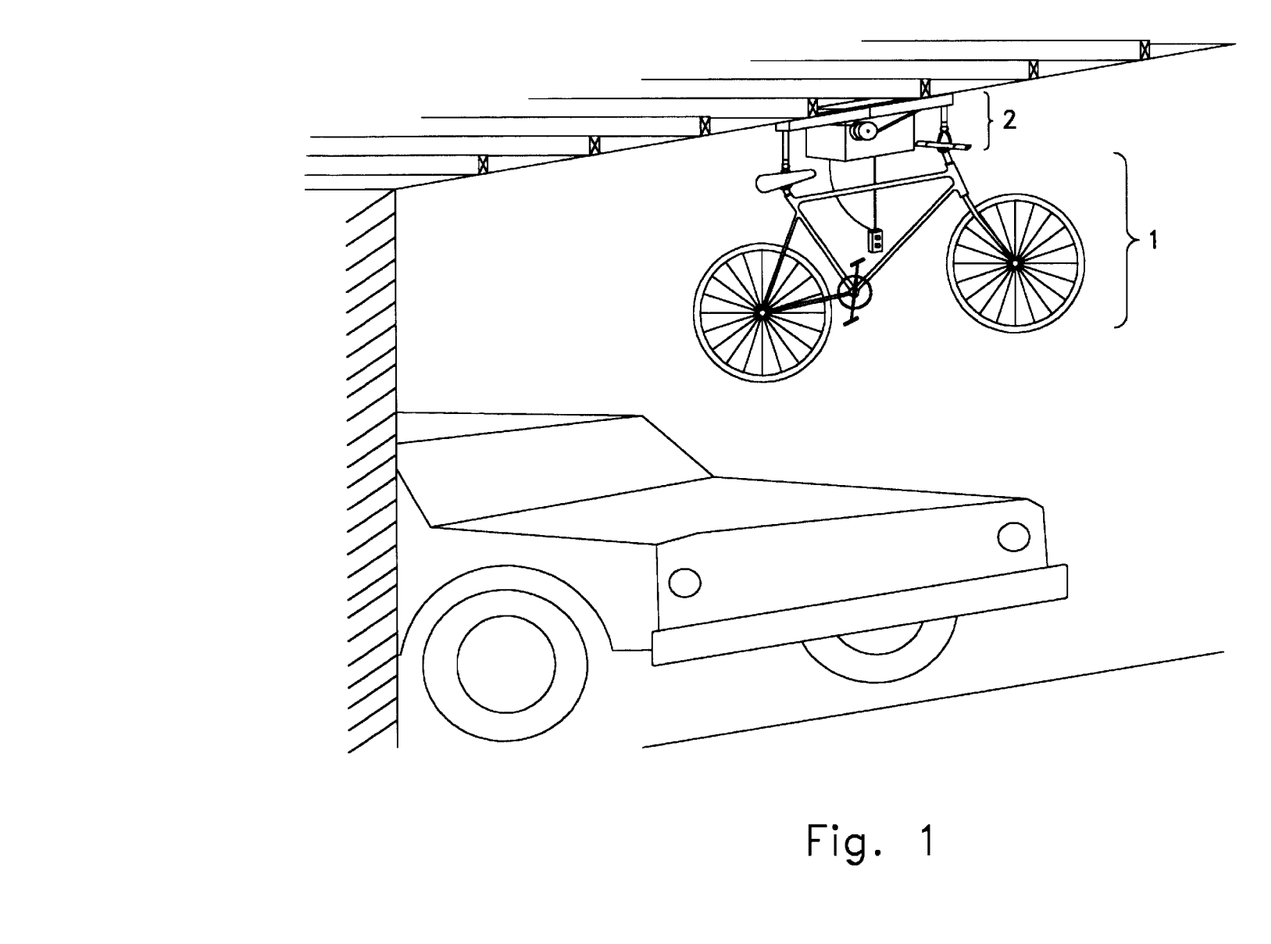
FIG. 1 is a schematic full view of one preferred embodiment of the invention showing a stored bicycle in a garage setting above an automobile.

FIG. 1 shows one embodiment of the present invention in a garage setting. A bicycle (1) is lifted and stored over an automobile by the bicycle storage system (2). This bicycle storage system is operated by an operating unit and this operating unit may be an electrical unit, as illustrated in FIG. 1 and detailed in FIG. 2.

Figure 2:
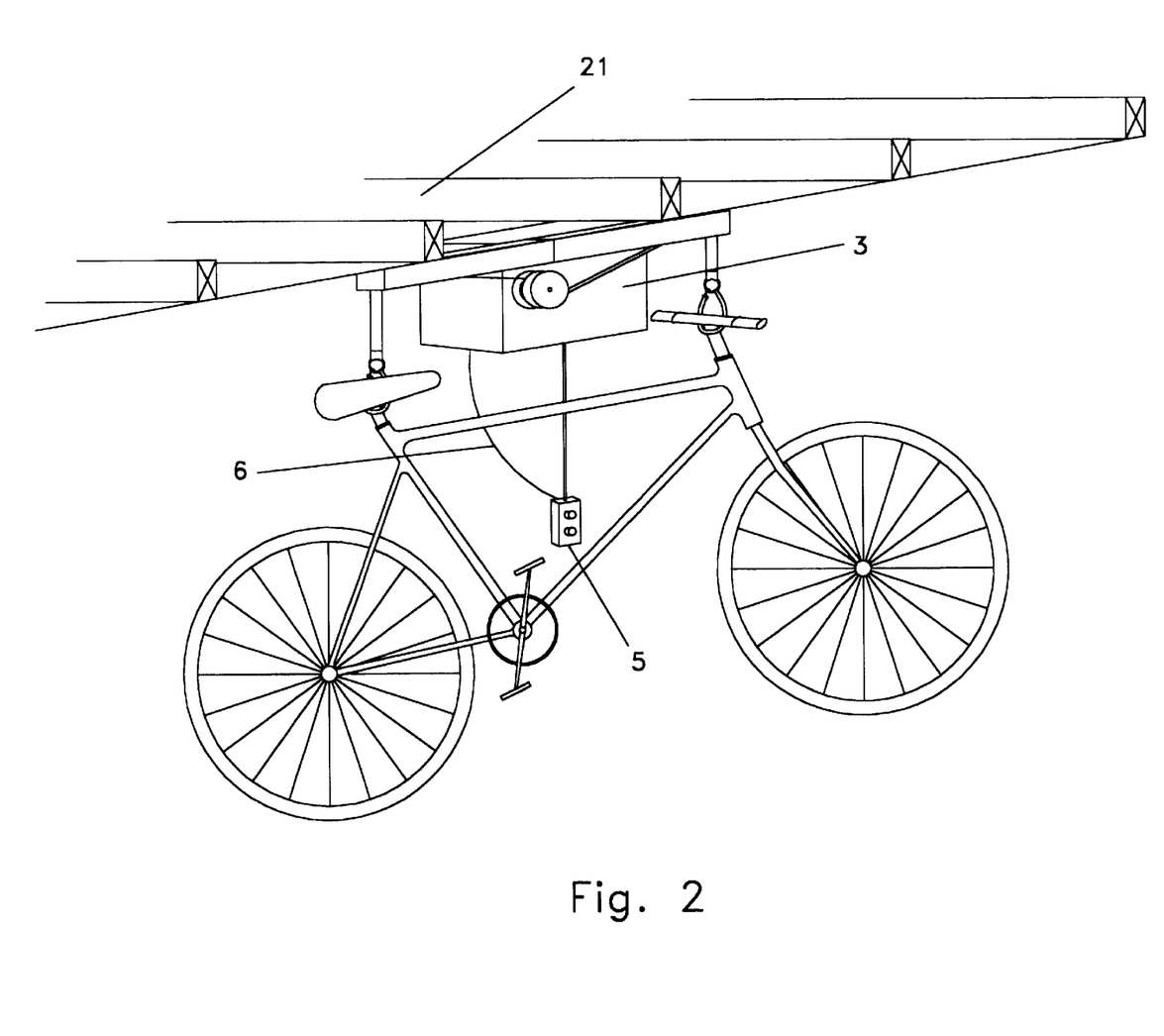
FIG. 2 is a schematic full view of the detailed bicycle storage system.
Figure 3:
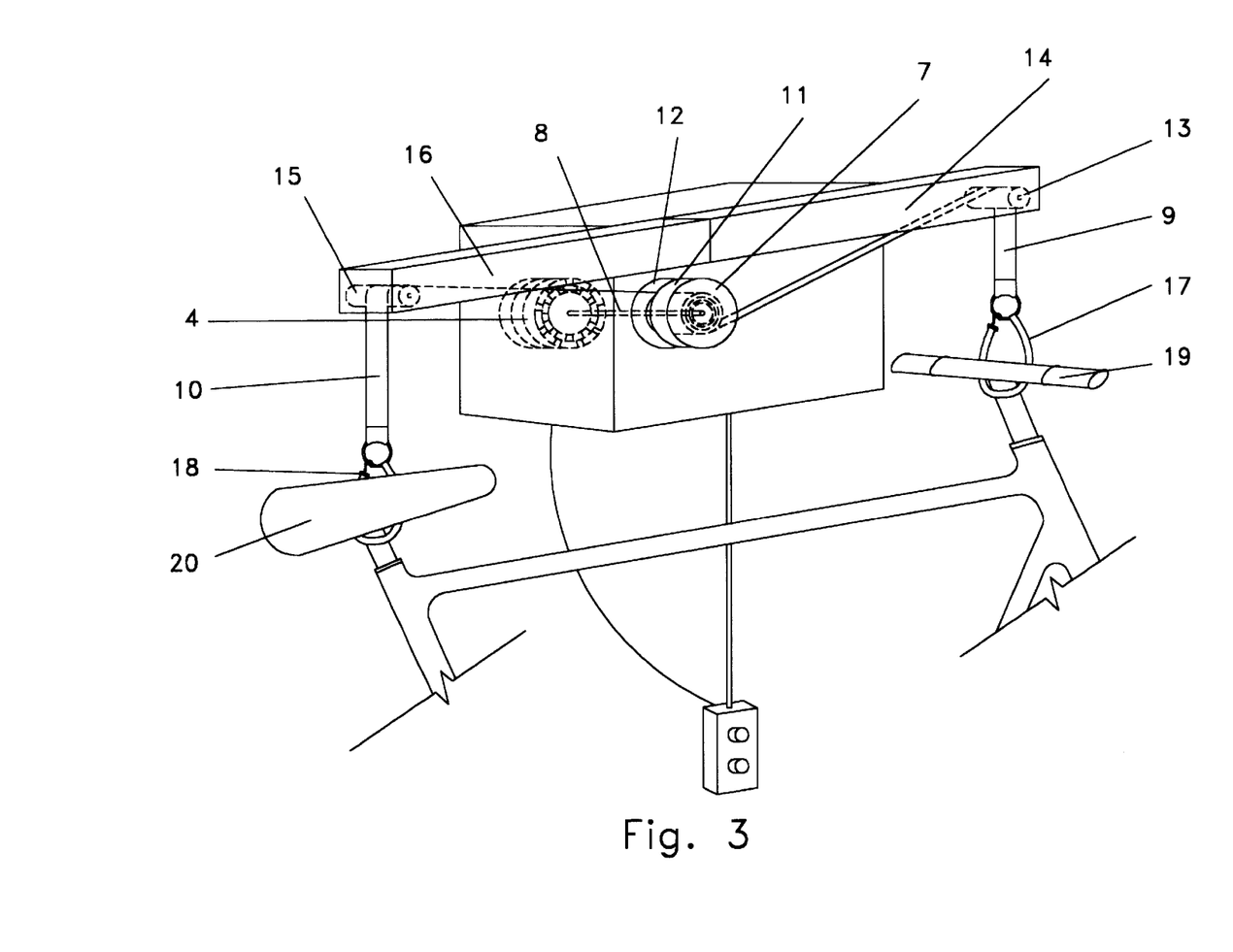
FIG. 3 is a detailed, anatomical view of the device from one preferred embodiment of the present invention.

As shown in FIG. 2, the electrical unit may comprise a motor housing (3) to hold a motor (4, shown in FIG. 3). The motor (4) may be controlled by a control unit such as a hanging switch (5). Power is supplied from a power source to operate the motor as expected and the hanging switch can have both the "UP" and "DOWN" commands and, when neither of the two commands are given, a power shutoff mechanism automatically keeps the system in a power off mode. A stretching cord (6) may be attached to the hanging switch to uphold the hanging switch. The system may be also operated by a remote control unit (not shown). In this case, a sensor may be incorporated to the motor to sense a remote signal and thus to control the motor.

Figure 5:
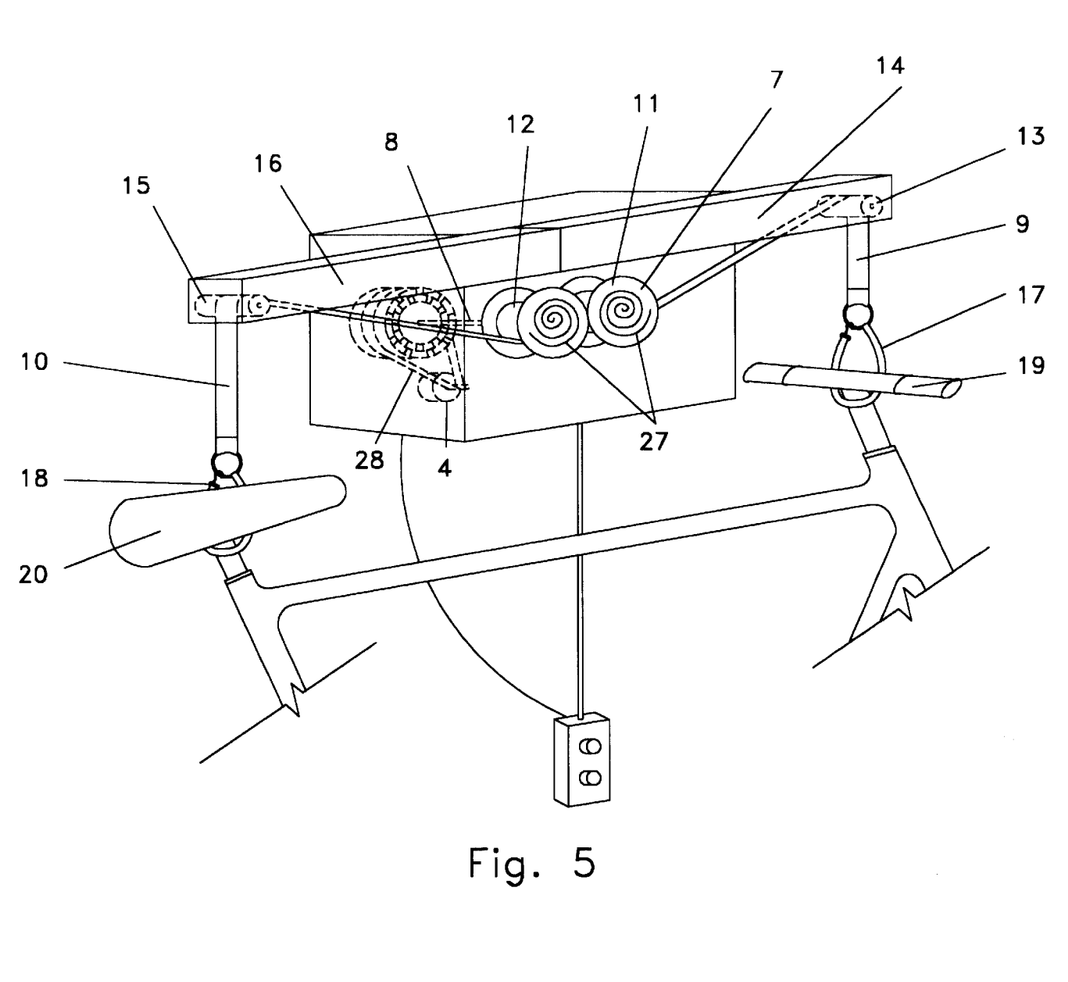
FIG. 5 is a view of another embodiment of the device of the present invention.

As detailed in FIGS. 3 and 5, the motor (4) may be connected to a reel (7) to drive the reel. In one configuration the motor (4) may share the same axle (8) with the reel (7) in a concentric way, thus the motor will drive the reel directly. In another configuration, the motor may be connected with the reel via a circular driving belt (28). Thus, the motor drives the reel indirectly. The reel may be mechanically combined to a first strap (9) and a second strap (10). The first and second straps wind around the reel in either a counterclockwise or a clockwise direction and may also be mechanically combined between themselves. The reel in one configuration may have only one track on it and, in another configuration, the reel may contain two tracks. In the later case, the reel is called a dual reel and the first track (11) may be occupied by the first strap and the second track (12) by the second strap. In one preferred embodiment, at least the first strap may be distantly extended to pass through or over a pivoting element (13) such as a pulley before reaching a bicycle. This design greatly facilitates the movement of the bicycle. For installation convenience, a single unit design may be achieved by simply providing a supporting frame that can hold the motor in the motor housing, the reel and the pivoting element together. In this embodiment, the supporting frame may be designed to serve as a supporting arm (14) to hold the reel and the pivoting element and to facilitate the strap movement. The supporting element can be perpendicular to the reel. For a clear explanation hereon this supporting arm now is defined as the first supporting arm.

In another preferred embodiment, the second strap (10) may also be distantly extended to pass a second pivoting element (15) such as a pulley, as illustrated in FIG. 3. Similarly, a second supporting arm (16) may be added perpendicularly to the reel so that the system may be configured to have the reel in the central region and the first and the second supporting arms located on each side the reel. The first and second pivoting elements can be each located on the distal ends of the supporting arms.

Two bicycle connectors may be needed in each of the above aforementioned designs. The bicycle connectors may be a pair of slings (17 and 18) and may be mechanically connected to the first and second straps separately. The first sling (17) may be connected to a bicycle handle (19) and the second sling (18) to a bicycle seat (20), or vice versa.

The single-piece bicycle storage system can be fixed to the garage ceiling (21, shown in FIG. 2) by any means that a person of ordinary skill will readily utilize. Thus, the system is permanently fixed on the garage ceiling and the bicycle can be lifted above the floor so that the floor space can be cleared for its intended use.

Figure 4:
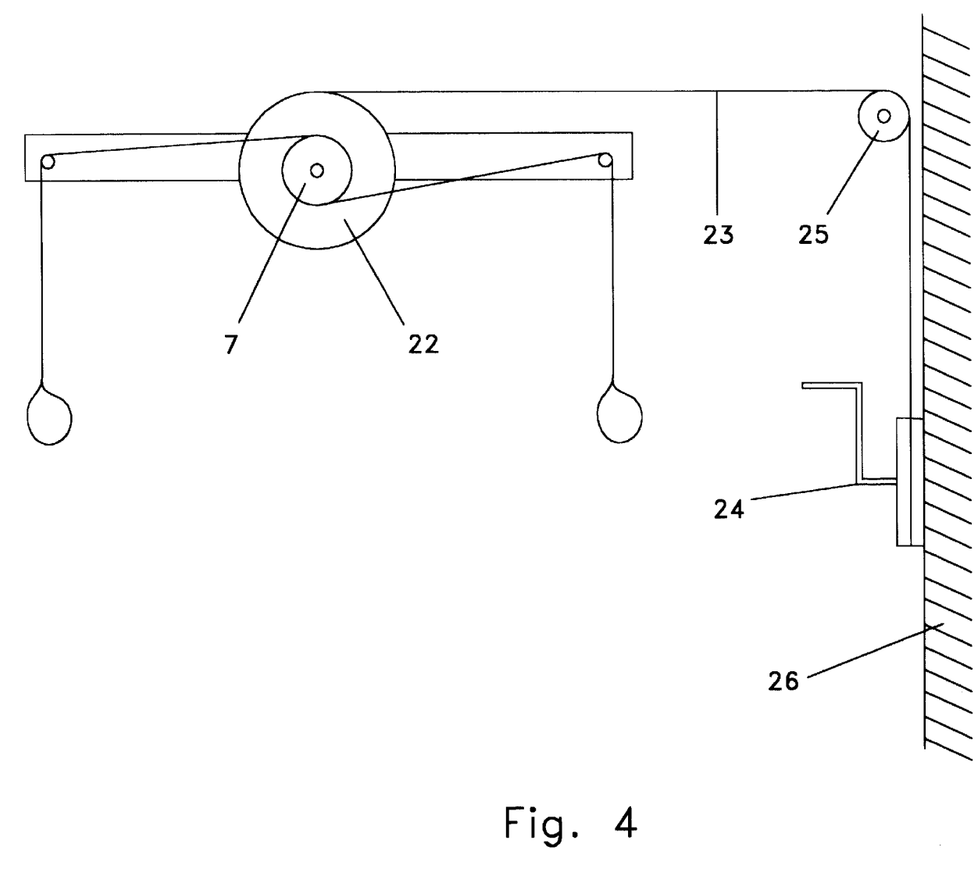
FIG. 4 is a front view of the mechanically operated bicycle storage system from another preferred embodiment of the present invention.

In still another preferred embodiment of the present invention, this device can also be operated by a mechanical unit in addition to its electrical operability. As can be readily understood, to accomplish the mechanical design, an assistant reel (22) as seen in FIG. 4, in replacement of the motor, may be needed. The assistant reel may be fixed on the same axle as the reel (7) in a concentric fashion. Thus, when the assistant reel turns around, so does the reel (7) in the same orientation as that of the assistant reel. A third strap (23), mechanically fixed to the assistant reel, may be wound around the assistant reel and serve as a pulling strap. The winding direction of the third strap may be configured so that, when the bicycle is released from the storage position to the floor, the third step winds around the assistant reel. Opposite to this motion, when the third strap is pulled from the assistant reel, the bicycle is lifted up to a storage position. The second end of the pulling strap may be mechanically fixed to a mechanical crank (24) or other retention element and may be facilitated by a pulley means (25). A retention unit (not shown) may be part of the crank to hold the pulling strap (23) after a bicycle is lifted to a designated elevation above the floor. Both the crank (24) and the pulley means (25) may be fixed on a garage wall (26).

In still another preferred embodiment of the present invention, a second reel (not shown) may be geared to the first reel to jointly lift the bicycle. In this configuration, the first strap may be mechanically attached to and be wound around the first reel in one direction, i.e., either a counter-clockwise or a clockwise direction; the second strap mechanically attached to and wound around the second reel in a direction opposite to that of the first strap. This system may be operated by either an electrical unit or a mechanical unit. The motor or the assistant reel only needs to be arranged to connect to the first or the second reel.

In still another preferred embodiment of the present invention, an elastical element may be combined onto the reel, the dual reel or, in a two-reel setting, both the reels, to offset some of the bicycle weight. The elastical element may contain a spring (27). In one-reel configuration, the spring may be mechanically combined to the reel; in a two-reel configuration, a first spring may be combined to the first reel and the a second spring to the second reel. In one preferred embodiment, the springs may be a compression spring, a torsion spring, or some type of biasing element.

The foregoing discussion and the claims which follow describe the preferred embodiments of the present invention. Particularly with respect to the claims, it should be obvious and understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied. The claims cover not only the apparatus as disclosed in this invention but also the methods on which the invention is based.

What is claimed is:

1. A bicycle storage system for use in a garage, comprising:
   a. a reel;
   b. a first strap having an end, and attached to said reel at a location so as to be wound about said reel;
   c. a second strap having an end, and attached to said reel at a location so as to be wound about said reel, and feeding out from said reel in an opposite direction from said first strap;
   d. at least one bicycle connector attached to at least one of said ends of said straps; and
   e. an operating unit adapted to cause rotation of said reel whereby said first and second straps provide for vertical lifting movement of a bicycle.

2. A bicycle storage system for use in a garage as described in claim 1 wherein both said first and said second straps wind around said reel in either a counterclockwise or a clockwise direction.

3. A bicycle storage system for use in a garage as described in claim 2 wherein said first strap is connected to a first bicycle connector and said second strap connected to a second bicycle connector.

4. A bicycle storage system for use in a garage as described in claim 3 wherein said first bicycle connector comprises a first sling and said second bicycle connector comprises a second sling.

5. A bicycle storage system for use in a garage as described in claim 1 wherein said operating unit comprises a mechanical unit.

6. A bicycle storage system for use in a garage as described in claim 5 wherein said mechanical unit comprises a third strap and wherein said third strap is responsive to a third pivoting element fixed relative to said mechanical unit.

7. A bicycle storage system for use in a garage as described in claim 6 wherein said third strap winds around an assistant reel and wherein said reel and said assistant reel are concentric.

8. A bicycle storage system for use in a garage as described in claim 5 wherein said mechanical unit comprises a mechanical crank.

9. A bicycle storage system for use in a garage as described in claim 5 wherein said mechanical unit comprises a retention element to hold said bicycle after it is lifted.

10. A bicycle storage system for use in a garage as described in claim 1 wherein said operating unit comprises an electrical unit.

11. A bicycle storage system for use in a garage as described in claim 10 wherein said electrical unit comprises a power source.

12. A bicycle storage system for use in a garage as described in claim 10 wherein said electrical unit comprises a motor.

13. A bicycle storage system for use in a garage as described in claim 12 wherein said motor comprises said reel and wherein said motor drives said reel through an axle.

14. A bicycle storage system for use in a garage as described in claim 12 wherein said motor comprises a circular driving belt and wherein said motor drives said reel via said circular driving belt.

15. A bicycle storage system for use in a garage as described in claim 10 wherein said electrical unit comprises a remote control unit.

16. A bicycle storage system for use in a garage as described in claim 15 wherein said electrical unit comprises a sensor.

17. A bicycle storage system for use in a garage as described in claim 10 wherein said electrical unit comprises a hanging switch.

18. A bicycle storage system for use in a garage as described in claim 17 wherein said hanging switch comprises a stretching cord and wherein said stretching cord holds said hanging switch.

19. A bicycle storage system for use in a garage as described in claim 18 wherein said hanging switch controls said motor.

20. A bicycle storage system for use in a garage as described in claim 19 wherein said hanging switch comprises a power shutoff.

21. A bicycle storage system for use in a garage as described in claim 1 further comprising a supporting pivoting element wherein said first strap passes over said supporting pivoting element.

22. A bicycle storage system for use in a garage as described in claim 21 further comprising at least one arm on one side of said reel and mounted to said operating unit and wherein said arm is perpendicular to said reel.

23. A bicycle storage system for use in a garage as described in claim 22 wherein said supporting pivoting element is located on the remote end of said arm.

24. A bicycle storage system for use in a garage as described in claim 23 wherein said supporting pivoting element comprises a pulley and wherein said pulley facilitates movement of said first strap.

25. A bicycle storage system for use in a garage as described in claim 21 further comprising a second supporting pivoting element and a second arm on the other side of said reel relative to said first supporting pivoting element and said first arm, wherein said second arm is perpendicular to said reel and wherein said first arm is aligned straight with said second arm.

26. A bicycle storage system for use in a garage as described in claim 25 wherein said first supporting pivoting element and said second supporting pivoting element are located on the remote ends of said arm and said second arm.

27. A bicycle storage system for use in a garage as described in claim 25 wherein said second supporting pivoting element comprises a second pulley and wherein said second pulley facilitates movement of said second strap.

28. A bicycle storage system for use in a garage as described in claim 1 wherein said reel comprises a dual reel and wherein said dual reel comprises a first track and a second track.

29. A bicycle storage system for use in a garage as described in claim 28 wherein said first strap winds around said first track and wherein said second strap winds around second track.

30. A bicycle storage system for use in a garage as described in claim 1 wherein said reel comprises a first reel, wherein said bicycle storage system further comprises a second reel mechanically geared to said first reel and wherein said second strap is mechanically attached to said second reel.

31. A bicycle storage system for use in a garage as described in claim 30 further comprising a second supporting pivoting element wherein said second strap passes over said second supporting pivoting element.

32. A bicycle storage system for use in a garage as described in claim 31 wherein said first strap winds counter clockwise around said first reel.

33. A bicycle storage system for use in a garage as described in claim 32 wherein said second strap winds around said second reel clockwise and wherein said first strap and said second strap move in the same vertical directions.

34. A bicycle storage system for use in a garage as described in claim 30 wherein said second reel further comprises an elastic element mechanically combined to said second reel to offset at least some of the weight of said bicycle.

35. A bicycle storage system for use in a garage as described in claim 34 wherein said elastic element comprises a second compression, biasing spring mechanically combined to said second reel.

36. A bicycle storage system for use in a garage as described in claim 1 wherein said reel further comprises an elastic element mechanically combined to said reel to offset at least some of the weight of said bicycle.

37. A bicycle storage system for use in a garage as described in claim 36 wherein said elastic element comprises a compression, biasing spring mechanically combined to said reel to offset at least some of the weight of said bicycle.

38. A method of storing a bicycle in a garage, comprising the steps of:
 a. creating a reel;
 b. attaching a first strap and a second strap each having an end to said reel at locations so as to be wound about said reel, said first strap and said second strap feeding out in opposite directions from said reel;
 c. winding said first strap and said second strap around said reel;
 d. connecting said first strap and said second strap to a bicycle at said ends of said straps;
 e. operating said reel wherein said first strap and said second strap move and lift said bicycle vertically.

39. A method of storing a bicycle in a garage as described in claim 38 wherein said step of attaching said first strap and said second strap to said reel comprises a step of mechanically fixing one end from each of said first strap and said second strap to said reel.

40. A method of storing a bicycle in a garage as described in claim 38 wherein said step of winding said first strap around said reel comprises a step of winding said first strap around said reel in either a counterclockwise or clockwise direction.

41. A method of storing a bicycle in a garage as described in claim 38 wherein said step of connecting said first strap and said second strap to a bicycle comprises a step of connecting said first strap to one end of said bicycle via a first sling and said second strap to the other end of said bicycle via a second sling.

42. A method of storing a bicycle in a garage as described in claim 41 wherein said step of connecting said first strap to one end of said bicycle via a first sling and said second strap to the other end of said bicycle via a second sling comprises a step of connecting said first strap to the handle of said bicycle via a first sling and said second strap to the seat of said bicycle via a second sling.

43. A method of storing a bicycle in a garage as described in claim 38 wherein said step of operating said reel comprises a step of mechanically operating said reel.

44. A method of storing a bicycle in a garage as described in claim 43 wherein said step of mechanically operating said reel comprises a step of mechanically pulling a third strap.

45. A method of storing a bicycle in a garage as described in claim 44 wherein said step of mechanically pulling a third strap comprises a step of mechanically unwinding third strap from an assistant reel.

46. A method of storing a bicycle in a garage as described in claim 45 wherein said step of mechanically unwinding third strap from an assistant reel comprises a step of mechanically winding said first strap and said second strap around said reel wherein said bicycle moves upwards.

47. A method of storing a bicycle in a garage as described in claim 44 wherein said step of mechanically operating said reel comprises a step of mechanically releasing said third strap.

48. A method of storing a bicycle in a garage as described in claim 47 herein said step of mechanically releasing said third strap comprises a step of mechanically winding said third strap around said assistant reel.

49. A method of storing a bicycle in a garage as described in claim 48 wherein said step of mechanically winding said third strap around said assistant reel comprises a step of mechanically unwinding said first strap and said second strap from said reel wherein said bicycle moves downwards.

50. A method of storing a bicycle in a garage as described in claim 44 wherein said step of mechanically pulling a third strap comprises a step of retaining said third strap.

51. A method of storing a bicycle in a garage as described in claim 43 wherein said step of mechanically operating said reel comprises a step of mechanically cranking said reel.

52. A method of storing a bicycle in a garage as described in claim 38 wherein said step of operating said reel comprises a step of electrically operating said reel.

53. A method of storing a bicycle in a garage as described in claim 52 wherein said step of electrically operating said reel comprises a step of supplying power to said reel.

54. A method of storing a bicycle in a garage as described in claim 52 wherein said step of electrically operating said reel comprises a step of electrically operating said reel with a motor.

55. A method of storing a bicycle in a garage as described in claim 54 wherein said step of electrically operating said reel with a motor comprises a step of electrically driving said reel directly with said motor wherein said reel is on said motor.

56. A method of storing a bicycle in a garage as described in claim 55 wherein said step of electrically driving said reel directly with said motor comprises a step of electrically winding said first strap and said second strap around said reel wherein said bicycle moves upwards.

57. A method of storing a bicycle in a garage as described in claim 55 wherein said step of electrically driving said reel directly with said motor comprises a step of electrically unwinding said first strap and said second strap from said reel wherein said bicycle moves downward.

58. A method of storing a bicycle in a garage as described in claim 55 wherein said step of electrically operating said reel comprises a step of electrically driving said reel indirectly via a circular driving belt.

59. A method of storing a bicycle in a garage as described in claim 54 wherein said step of electrically operating said reel with a motor comprises a step of remotely controlling said motor.

60. A method of storing a bicycle in a garage as described in claim 59 wherein said step of remotely controlling said motor comprises a step of remotely sensing controlling signals.

61. A method of storing a bicycle in a garage as described in claim 54 wherein said step of electrically operating said reel with a motor comprises a step of controlling said motor in up and down commands.

62. A method of storing a bicycle in a garage as described in claim 61 wherein said step of controlling said motor in up and down commands comprises a step of electrically disconnecting said motor from a power source.

63. A method of storing a bicycle in a garage as described in claim 38 further comprises a step of distantly pivoting a supporting pivoting element wherein said first strap passes around said supporting pivoting element and wherein said supporting pivoting element facilitates movement of said first strap.

64. A method of storing a bicycle in a garage as described in claim 63 wherein said step of distantly pivoting a supporting pivoting element comprises a step of distantly pivoting a pulley.

65. A method of storing a bicycle in a garage as described in claim 63 further comprising the step of distantly pivoting a second supporting pivoting element concurrently with said supporting pivoting element wherein said second strap passes over said second supporting pivoting element and wherein said second supporting pivoting element facilitates movement of said second strap.

66. A method of storing a bicycle in a garage as described in claim 65 wherein said step of distantly pivoting a second supporting pivoting element concurrently with said supporting pivoting element comprises a step of distantly pivoting a second pulley concurrently with said pulley.

67. A method of storing a bicycle in a garage as described in claim 63 further comprising the step of distantly pivoting a second supporting pivoting element concurrently with said supporting pivoting element wherein said second strap passes over said second supporting pivoting element and wherein said second supporting pivoting element facilitates movement of said second strap.

68. A method of storing a bicycle in a garage as described in claim 38 wherein said step of creating a reel comprises a step of establishing a dual reel wherein said dual reel comprises a first track and a second track.

69. A method of storing a bicycle in a garage as described in claim 68 further comprising a step of mechanically combining said first strap and said second strap to said dual reel.

70. A method of storing a bicycle in a garage as described in claim 69 wherein said step of mechanically combining said first strap and said second strap to said dual reel comprises a step of mechanically combining said first strap to said first track of said dual reel and said second strap to said second track of said dual reel.

71. A method of storing a bicycle in a garage as described in claim 38 wherein said step of creating a reel comprises a step of establishing a first reel and a second reel wherein said second reel is mechanically geared to said first reel.

72. A method of storing a bicycle in a garage as described in claim 71 wherein said step of winding said first strap around said reel comprises a step of winding said first strap counter clockwise around said first reel.

73. A method of storing a bicycle in a garage as described in claim 71 wherein said step of winding said second strap around said reel comprises a step of winding said second strap clockwise around said second reel wherein said first strap and said second strap move in the same vertical directions.

74. A method of storing a bicycle in a garage as described in claim 71 wherein said step of moving said bicycle in vertical directions comprises a step of elastically balancing the weight of said bicycle wherein power of a motor required becomes minimal.

75. A method of storing a bicycle in a garage as described in claim 38 wherein said step of moving said bicycle in vertical directions comprises a step of elastically balancing the weight of said bicycle wherein power of a motor required becomes minimal.

* * * * *